US012615083B2

(12) United States Patent
Zhang et al.

(10) Patent No.: US 12,615,083 B2
(45) Date of Patent: Apr. 28, 2026

(54) METHOD TO INDICATE EPHEMERIS INFORMATION, AND SYSTEM AND APPARATUS THEREOF

(71) Applicant: ZTE CORPORATION, Shenzhen (CN)

(72) Inventors: Chenchen Zhang, Shenzhen (CN); Nan Zhang, Shenzhen (CN); Wei Cao, Shenzhen (CN); Kaibo Tian, Shenzhen (CN); Zhen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 18/484,743

(22) Filed: Oct. 11, 2023

(65) Prior Publication Data

US 2024/0146404 A1 May 2, 2024

Related U.S. Application Data

(63) Continuation of application No. PCT/CN2021/093100, filed on May 11, 2021.

(51) Int. Cl.
*H04B 7/185* (2006.01)
*H04W 64/00* (2009.01)

(52) U.S. Cl.
CPC ...... *H04B 7/18519* (2013.01); *H04W 64/006* (2013.01)

(58) Field of Classification Search
CPC .......................... H04B 7/18519; H04W 64/006
See application file for complete search history.

(56) References Cited

U.S. PATENT DOCUMENTS

| | | | | |
|---|---|---|---|---|
| 2010/0013701 A1* | 1/2010 | Fischer | ................. | H04W 64/00 |
| | | | | 342/357.43 |
| 2022/0070738 A1* | 3/2022 | Tripathi | ................. | H04W 28/24 |

FOREIGN PATENT DOCUMENTS

| | | |
|---|---|---|
| CN | 104035976 A | 9/2014 |
| CN | 110212969 A | 9/2019 |
| CN | 111123313 A | 5/2020 |
| WO | WO-2020/144572 A1 | 7/2020 |
| WO | WO-2021/066706 A1 | 4/2021 |

OTHER PUBLICATIONS

3rd Generation Partnership Project, "Technical Specification Group Radio Access Network; Solutions for NR to support non-terrestrial networks (NTN) (Release 16)", 3GPP TR 38.821, V16.0.0, Dec. 2019, Valbonne, France (140 pages).
International Search Report and Written Opinion for PCT Appl. No. PCT/CN2021/093100, mailed on Feb. 17, 2022 (8 pages).

* cited by examiner

*Primary Examiner* — Samina F Choudhry
(74) *Attorney, Agent, or Firm* — Foley & Lardner LLP

(57) ABSTRACT

A wireless communication method for use in a wireless terminal is disclosed. The method comprises receiving, from a wireless network node, ephemeris information comprising a node position and a velocity of a wireless network node, wherein the ephemeris information comprises an association index and a relative position.

18 Claims, 10 Drawing Sheets

100

110

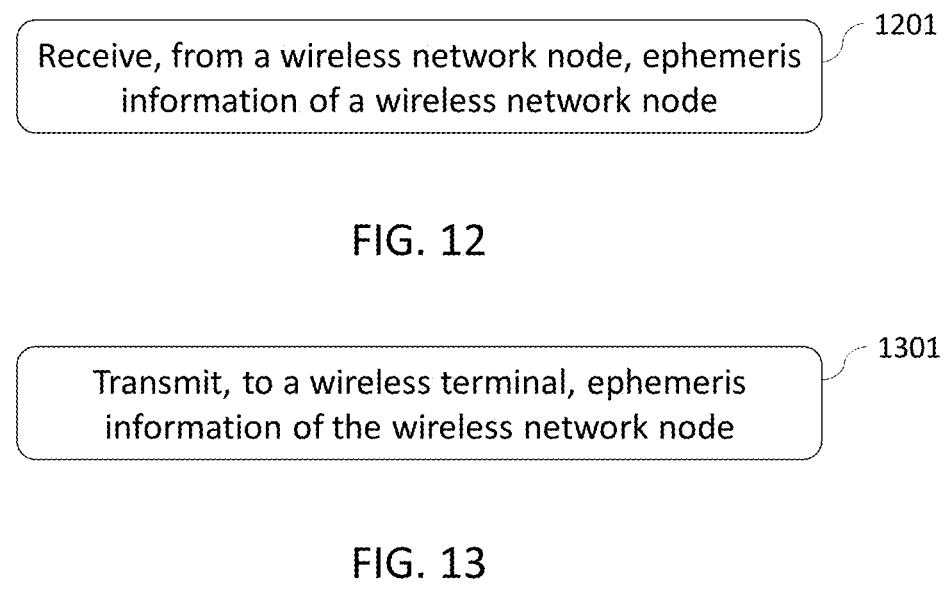

Receive, from a wireless network node, ephemeris information of a wireless network node — 1201

FIG. 12

Transmit, to a wireless terminal, ephemeris information of the wireless network node — 1301

FIG. 13

METHOD TO INDICATE EPHEMERIS INFORMATION, AND SYSTEM AND APPARATUS THEREOF

This application is a continuation of PCT/CN2021/093100, filed May 11, 2021, the content of which is incorporated herein by reference in its entirety.

TECHNICAL FIELD

This document is directed generally to wireless communications.

BACKGROUND

In non-terrestrial network (NTN) based wireless communications, a base station or a radio repeater (e.g., satellite, high altitude pseudo-satellite (HAPS) or unmanned aerial vehicles (UAV)) may be far away from a user equipment (UE) or have large velocity, which cause large timing offset (TO) and frequency offset (FO) in corresponding wireless channels.

In order to eliminate negative effects due to the large TO and FO, the UE estimates and pre-compensates the TO and FO based on its own position/velocity and the position/velocity of the base station or the radio repeater. To fulfill the pre-compensation, the base station or the radio repeater needs to periodically broadcast its ephemeris. A UE that wants to initialize access needs to read the ephemeris for further pre-compensations.

SUMMARY

With the indicated ephemeris, the UE is able to predict the position and velocity of the base station or radio repeater within a limited time. The accuracy of the prediction may be affected by the format of the ephemeris. A format with larger bit size may increase the accuracy, but may also cause extra signaling overhead and power consumption.

This document relates to methods, systems, and devices for indicating ephemeris information, and in particular to methods, systems, and devices for indicating ephemeris information in the NTN.

The present disclosure relates to a wireless communication method for use in a wireless terminal. The method comprises receiving, from a wireless network node, ephemeris information comprising a node position and a velocity of a wireless network node.

Various embodiments may preferably implement the following features:

Preferably or in some embodiments, the ephemeris information comprises an association index and a relative position which are associated with the node position.

Preferably or in some embodiments, the association index indicates one of a plurality of reference regions based on a wireless terminal position of the wireless terminal.

Preferably or in some embodiments, the association index is an index of the indicated reference region.

Preferably or in some embodiments, the relative position indicates a difference between the node position and a reference point in a reference region associated with the associated index.

Preferably or in some embodiments, the reference point is a center of the reference region.

Preferably or in some embodiments, at least one configuration parameter associated with the reference region comprises at least one of a reference point, an edge width, an edge length, a degree range of latitude, a degree range of longitude or a valid time of the at least one configuration parameter.

Preferably or in some embodiments, at least one configuration parameter associated with the reference region is determined based on a network type of the wireless network node.

Preferably or in some embodiments, the ephemeris information comprises a first parameter associated with a first value on a first axis, a second parameter associated with a second value on a second axis and a third parameter associated with a third value on a third axis, and the first parameter, the second parameter and the third parameter are associated with at least one of a position, the relative position or the velocity.

Preferably or in some embodiments, a first range of the first value is determined based on the second value and the third value.

Preferably or in some embodiments, a second range of the second value is determined based on the third value.

Preferably or in some embodiments, the first parameter, the second parameter and the third parameter are associated with a plurality of bits, and a number of bits associated with the first parameter within the plurality of bits is determined based on the second value and the third value.

Preferably or in some embodiments, a number of bits associated with the second parameter within the plurality of bits is determined based on the third value.

Preferably or in some embodiments, a number of bits associated with the first parameter within the plurality of bits is smaller than or equal to at least one of a number of bits associated with the second parameter within the plurality of bits or a number of bits associated with the third parameter within the plurality of bits.

Preferably or in some embodiments, the number of bits associated with the second parameter within the plurality of bits is smaller than or equal to the number of bits associated with the third parameter within the plurality of bits.

Preferably or in some embodiments, two of the first parameter, the second parameter and the third parameter are mapped to a plurality of centers of a plurality of hexagons.

Preferably or in some embodiments, the first parameter, the second parameter and the third parameter are mapped to a plurality of centers of a plurality of truncated octahedrons.

Preferably or in some embodiments, the first axis, the second axis and the third axis are axes of a polar coordinate system.

Preferably or in some embodiments, the first parameter, the second parameter and the third parameter are mapped to one of a plurality of positions, and a density of the positions in a confidence position range is greater than a density of the positions outside of the confidence position range.

Preferably or in some embodiments, the confidence position range is determined based on a network type of the wireless network node.

The present disclosure relates to a wireless communication method for use in a wireless network node. The method comprises transmitting, to a wireless terminal, ephemeris information comprising a node position and a velocity of the wireless network node.

Various embodiments may preferably implement the following features:

Preferably or in some embodiments, the ephemeris information comprises an association index and a relative position which are associated with the node position.

Preferably or in some embodiments, the association index indicates one of a plurality of reference regions based on a wireless terminal position of the wireless terminal.

Preferably or in some embodiments, the association index is an index of the indicated reference region.

Preferably or in some embodiments, the relative position indicates a difference between the node position and a reference point in a reference region associated with the associated index.

Preferably or in some embodiments, the reference point is a center of the reference region.

Preferably or in some embodiments, at least one configuration parameter associated with the reference region comprises at least one of a reference point, an edge width, an edge length, a degree range of latitude, a degree range of longitude or a valid time of the at least one configuration parameter.

Preferably or in some embodiments, at least one configuration parameter associated with the reference region is determined based on a network type of the wireless network node.

Preferably or in some embodiments, the at least one configuration parameter comprises at least one of a reference point, an edge width, an edge length, a degree range of latitude, a degree range of longitude or a valid time of the at least one configuration parameter.

Preferably or in some embodiments, the ephemeris information comprises a first parameter associated with a first value on a first axis, a second parameter associated with a second value on a second axis and a third parameter associated with a third value on a third axis, and the first parameter, the second parameter and the third parameter are associated with at least one of a position, the relative position or the velocity.

Preferably or in some embodiments, a first range of the first value is determined based on the second value and the third value.

Preferably or in some embodiments, a second range of the second value is determined based on the third value.

Preferably or in some embodiments, the first parameter, the second parameter and the third parameter are associated with a plurality of bits, and a number of bits associated with the first parameter within the plurality of bits is determined based on the second value and the third value.

Preferably or in some embodiments, a number of bits associated with the second parameter within the plurality of bits is determined based on the third value.

Preferably or in some embodiments, a number of bits associated with the first parameter within the plurality of bits is smaller than or equal to at least one of a number of bits associated with the second parameter within the plurality of bits or a number of bits associated with the third parameter within the plurality of bits.

Preferably or in some embodiments, the number of bits associated with the second parameter within the plurality of bits is smaller than or equal to the number of bits associated with the third parameter within the plurality of bits.

Preferably or in some embodiments, two of the first parameter, the second parameter and the third parameter are mapped to a plurality of centers of a plurality of hexagons.

Preferably or in some embodiments, the first parameter, the second parameter and the third parameter are mapped to a plurality of centers of a plurality of truncated octahedrons.

Preferably or in some embodiments, the first axis, the second axis and the third axis are axes of a polar coordinate system.

Preferably or in some embodiments, the first parameter, the second parameter and the third parameter are mapped to one of a plurality of positions, and a density of the positions in a confidence position range is greater than a density of the positions outside of the confidence position range.

Preferably or in some embodiments, the confidence position range is determined based on a network type of the wireless network node.

The present disclosure relates to a wireless communication method for use in a wireless terminal. The method comprises receiving, from a wireless network node, ephemeris information comprising a semi-major axis, an eccentricity, an argument of periapsis, a longitude of ascending node, an inclination and a mean anomaly of a wireless network node.

Various embodiments may preferably implement the following features:

Preferably, the ephemeris information comprises an association index and a relative mean anomaly which are associated with the node position.

Preferably or in some embodiments, the association index indicates one of a plurality of reference regions based on a wireless terminal position of the wireless terminal.

Preferably or in some embodiments, the association index is an index of the indicated reference region.

Preferably or in some embodiments, the relative anomaly indicates a difference between the mean anomaly and a reference point in a reference region associated with the association index.

Preferably or in some embodiments, the reference point is a center, a starting point or an end point of the reference region.

Preferably or in some embodiments, the reference region is a fraction of an orbit of the wireless network node.

Preferably or in some embodiments, at least one configuration parameter associated with the reference region comprises at least one of a reference point, a degree range of one reference region or a valid time of the at least one configuration parameter.

Preferably or in some embodiments, at least one configuration parameter associated with the reference region is determined based on a network type of the wireless network node.

Preferably or in some embodiments, the semi-major axis is mapped to a confidence semi-major range smaller than a maximum range of the semi-major axis parameter.

Preferably or in some embodiments, the confidence semi-major range is determined based on a network type of the wireless network node.

Preferably or in some embodiments, the ephemeris information comprises an orbit index indicating a set of the semi-major axis, the eccentricity, the argument of periapsis, the longitude of ascending node and the inclination.

Preferably or in some embodiments, the ephemeris information comprises correction information associated with at least one of the semi-major axis, the eccentricity, the argument of periapsis, the longitude of ascending node and the inclination, and the semi-major axis, the eccentricity, the argument of periapsis, the longitude of ascending node and the inclination are determined based on correction information and the set of the semi-major axis, the eccentricity, the argument of periapsis, the longitude of ascending node and the inclination.

Preferably or in some embodiments, the correction information comprises at least one correction parameter corresponding to at least one of the semi-major axis, the eccentricity, the argument of periapsis, the longitude of ascending node and the inclination.

Preferably or in some embodiments, the correction information comprises correction parameters corresponding to threes position values of three axes and/or three velocity values of three axes.

The present disclosure relates to a wireless communication method for use in a wireless network node. The method comprises transmitting, to a wireless terminal, ephemeris information comprising a semi-major axis, an eccentricity, an argument of periapsis, a longitude of ascending node, an inclination and a mean anomaly of the wireless network node.

Various embodiments may preferably implement the following features:

Preferably or in some embodiments, the ephemeris information comprises an association index and a relative mean anomaly which are associated with the node position.

Preferably or in some embodiments, the association index indicates one of a plurality of reference regions based on a wireless terminal position of the wireless terminal.

Preferably or in some embodiments, the association index is an index of the indicated reference region.

Preferably or in some embodiments, the relative anomaly indicates a difference between the mean anomaly and a reference point in a reference region associated with the association index.

Preferably or in some embodiments, the reference point is a center, a starting point or an end point of the reference region.

Preferably or in some embodiments, the reference region is a fraction of an orbit of the wireless network node.

Preferably or in some embodiments, at least one configuration parameter associated with the reference region comprises at least one of a reference point, a degree range of one reference region or a valid time of the at least one configuration parameter.

Preferably or in some embodiments, at least one configuration parameter associated with the reference region is determined based on a network type of the wireless network node.

Preferably or in some embodiments, the semi-major axis is mapped to a confidence semi-major range smaller than a maximum range of the semi-major axis parameter.

Preferably or in some embodiments, the confidence semi-major range is determined based on a network type of the wireless network node.

Preferably or in some embodiments, the ephemeris information comprises an orbit index indicating a set of the semi-major axis, the eccentricity, the argument of periapsis, the longitude of ascending node and the inclination.

Preferably or in some embodiments, the ephemeris information comprises correction information associated with at least one of the semi-major axis, the eccentricity, the argument of periapsis, the longitude of ascending node and the inclination, and the semi-major axis, the eccentricity, the argument of periapsis, the longitude of ascending node and the inclination are determined based on correction information and the set of the semi-major axis, the eccentricity, the argument of periapsis, the longitude of ascending node and the inclination.

Preferably or in some embodiments, the correction information comprises at least one correction parameter corresponding to at least one of the semi-major axis, the eccentricity, the argument of periapsis, the longitude of ascending node and the inclination.

Preferably or in some embodiments, the correction information comprises correction parameters corresponding to threes position values of three axes and/or three velocity values of three axes.

The present disclosure relates to a wireless terminal. The wireless terminal comprises:
   a communication unit, configured to receive, from a wireless network node, ephemeris information comprising a node position and a velocity of a wireless network node.

Various embodiments may preferably implement the following feature:

Preferably or in some embodiments, the wireless terminal further comprises a processor configured to perform any of aforementioned wireless communication methods.

The present disclosure relates to a wireless network node. The wireless network node comprises:
   a communication unit, configured to transmit, to a wireless terminal, ephemeris information comprising a node position and a velocity of the wireless network node.

Various embodiments may preferably implement the following feature:

Preferably or in some embodiments, the wireless network node further comprises a processor configured to perform any of aforementioned wireless communication methods.

The present disclosure relates to a wireless terminal. The wireless terminal comprises:
   a communication unit, configured to receive, from a wireless network node, ephemeris information comprising a semi-major axis, an eccentricity, an argument of periapsis, a longitude of ascending node, an inclination and a mean anomaly of a wireless network node.

Various embodiments may preferably implement the following feature:

Preferably or in some embodiments, the wireless terminal further comprises a processor configured to perform any of aforementioned wireless communication methods.

The present disclosure relates to a wireless network node. The wireless network node comprises:
   a communication unit, configured to transmit, to a wireless terminal, ephemeris information comprising a semi-major axis, an eccentricity, an argument of periapsis, a longitude of ascending node, an inclination and a mean anomaly of a wireless network node.

Various embodiments may preferably implement the following feature:

Preferably or in some embodiments, the wireless network node further comprises a processor configured to perform any of aforementioned wireless communication methods.

The present disclosure relates to a computer program product comprising a computer-readable program medium code stored thereupon, the code, when executed by a processor, causing the processor to implement a wireless communication method recited in any one of foregoing methods.

The present disclosure, in accordance with the above described embodiments, provides an optimization on the ephemeris format to ensure prediction accuracy with limited bit size.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF DRAWINGS

FIG. 12 shows a flowchart of a method according to an embodiment of the present disclosure.

FIG. 13 shows a flowchart of a method according to an embodiment of the present disclosure.

DETAILED DESCRIPTION

Figure 1:
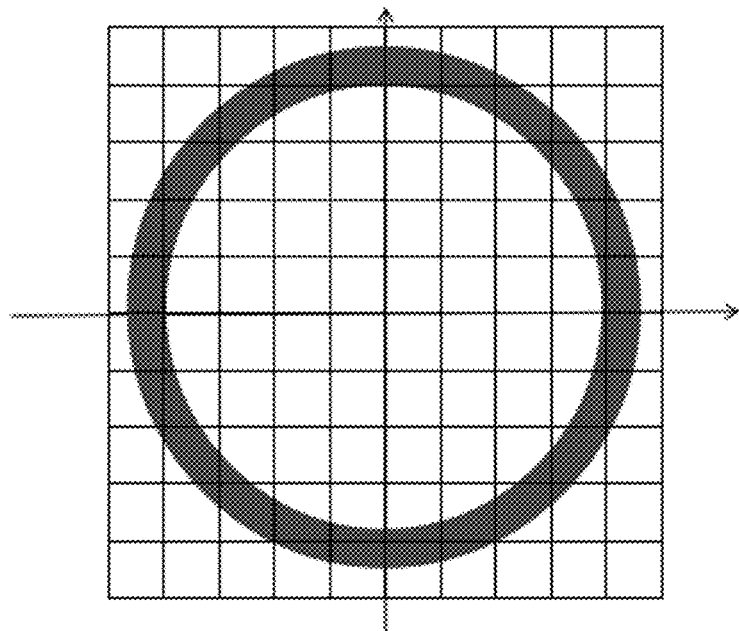
FIG. 1 shows a cross section of possible positions of a satellite according to an embodiment of the present disclosure.

FIG. 1 shows a cross section of possible positions of a satellite according to an embodiment of the present disclosure.

In the present disclosure, the base station or radio repeater may be that in the NTN. For example, the base station or radio repeater may be a satellite, an HAPS or a UAV.

In the present disclosure, an aircraft may refer to the base station or radio repeater (e.g., satellite, an HAPS or a UAV).

According to embodiments, the indicated ephemeris of the base station or radio repeater may have two options, i.e., instant position and velocity, or orbital parameters.

That is, according to option 1 satellite position and velocity state vectors (in Earth-Centered, Earth-Fixed (ECEF) coordinate system) are indicated as:

position X,Y,Z in ECEF (m), and velocity Vx,Vy,Vz in ECEF (m/s).

In particular, X, Y, Z are the positions along three axes and may be represented by the same number of bits. Similarly, Vx, Vy, Vz are the velocity along the three axes and may be represented by the same number of bits. The upper bound of error in the indication exponentially decreases with the increase in bit number.

According to option 2, at least the following parameters in orbital parameter ephemeris format are employed:

Semi-major axis $\alpha$ [m],

Eccentricity e,

Argument of periapsis $\omega$ [rad],

Longitude of ascending node $\Omega$ [rad],

Inclination i [rad], and

Mean anomaly M [rad] at epoch time $t_o$.

Option 2 is mainly used for the satellite. In the option 2, the first five parameters determine an ellipse orbit, and the final parameter mean anomaly M gives the position of the satellite in the ellipse orbit.

For both options, the UE is able to predict the state of the base station or radio repeater within at limited times.

In embodiments relating to option 1, the position and the velocity of the base station or radio repeater are assumed to be within a limited range. Any points that satisfy X, Y, $Z \in (-P_{max}, P_{max})$ and $V_x$, $V_y$, $V_z \in (-V_{max}, V_{max})$ can be approximately indicated using option 1. Suppose the bit number for each one of X, Y, Z is $N_p$ and the bit number for each one of $V_x$, $V_y$, $V_z$ is $N_v$. Then the error in indication is upper bounded by $P_{max}/2^{N_p}$, and $V_{max}/2^{N_v}$, respectively.

The base station or radio repeater of the NTN does not appear in every position within the range. Generally, the satellite, HAPS or UAV moves within a spherical shell, as shown in FIG. 1. For example, the position of a low Earth orbit (LEO) satellite in the 600 km orbit may always satisfy $\sqrt{X^2+Y^2+Z^2} \in 6371+600+(-10,10)$ km. Similarly, the position of a satellite in medium Earth orbit (MEO) 1200 network may always satisfies $\sqrt{X^2+Y^2+Z^2} \in 6371+600+(-10,10)$ km. Furthermore, a HAPS with nominal altitude 5 km may always have altitude within 5+(−1,1) km. Therefore, in an embodiment, the prior information (e.g. related to conditions which the base station or radio repeater satisfies and/or which limit the position of the base station or radio repeater satisfies) may be used to reduce the number of bits for one of X, Y, Z.

Within the prior information, two of the three parameters X, Y, Z can be represented by $$N_p^1$$

bits, and the remaining one can be represented by $$N_p^2$$

bits, which is smaller than or equal to $$N_p^1.$$

The $$2^{N_p^2}$$

status of the $$N_p^2$$

bits are mapped to the possible values of the third parameter. The UE first determines the range of possible values of the third parameter based on the value of the first two variables. Then the UE is able to derive the value of the third parameter.

Similarly, the bit number to indicate the velocity can be reduced because of the limited range of the velocity. For example, two of $V_x$, $V_y$, $V_z$ are represented by $$N_v^1$$

bits, and the third one is represented by $$N_v^2$$

bits which is smaller than or equal to $$N_v^1.$$

As shown in FIG. 1, according to an embodiment, when the first two parameters are different, the third parameter is within different possible ranges. Therefore, when the third parameter is indicated by a variable number of bits, the ephemeris can be indicated by using fewer bits. The BS will broadcast $$N_p^1, N_p^2, N_p^3$$

bits to represent the three parameters, in which $$N_p^1 = N_p^2 \geq N_p^3. \ N_p^3$$

is variable and can be determined based on the value of the first two parameters. The UE will determine $$N_p^3$$

after receiving the first two parameters and map the $$N_p^3$$

bits to the actual value of the third parameter.

Furthermore, given the first parameter, the range of possible values of the second parameter is also affected. Therefore, the bit number to represent the second parameter can also be variable. The BS will broadcast $$N_p^1, N_p^2, N_p^3$$

bits to represent the three parameters, in which $$N_p^1 \geq N_p^2 \geq N_p^3. \ N_p^2$$

is variable and can be determined based on the value of the first parameter.

$$N_p^3$$

is variable and can be determined based on the value of the first two parameters.

Figure 2:
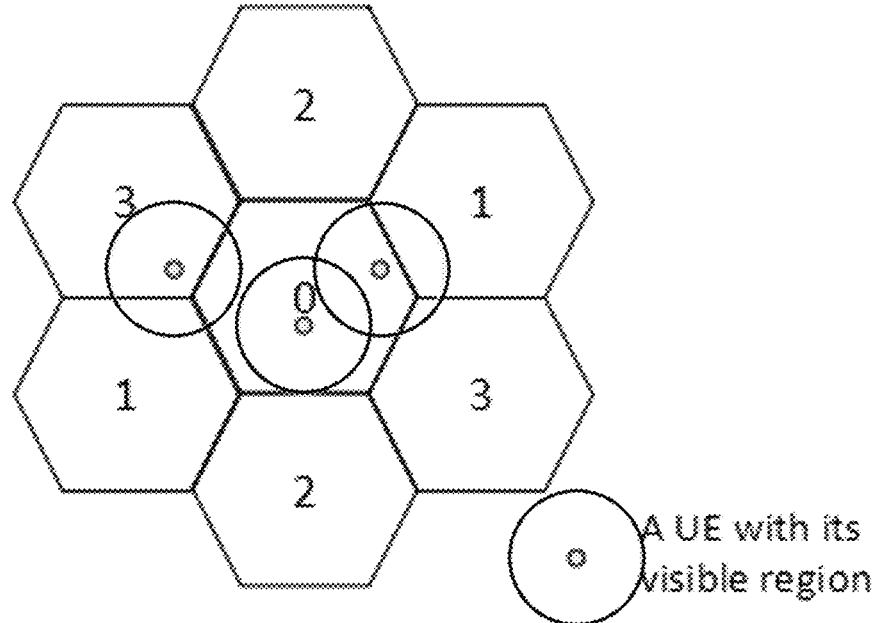
FIG. 2 shows a division of the total region into reference regions with associated indices according to an embodiment of the present disclosure.

FIG. 2 shows a division of the total region into reference regions with associated indices according to an embodiment of the present disclosure.

A UE can receive signals only from a limited area. When the UE knows its own position, the position of the UE can be used to determine a possible range of the position of the detected base station or radio repeater.

As shown in FIG. 2, the total region of possible positions can be divided into reference regions with associated numbers/indices. Because signal attenuates due to distance and blocking, the UE is assumed to have limited visible region, i.e., the signal from an aircraft (e.g., satellite, UAV, HAPS) within the region can be received by the UE. Note that, each of reference region may be a 3-dimensional space (e.g., truncated octahedron). For ease of illustrations, the reference regions shown in FIG. 2 are represented by 2-dimensional areas.

As shown in FIG. 2, when the visible region is smaller than one reference region, the UE will not receive signals from two reference regions which have the same associated index. By indicating the associated index and a relative position in the reference region, the actual position of the base station or radio repeater can be indicated with fewer bits.

Figure 3:
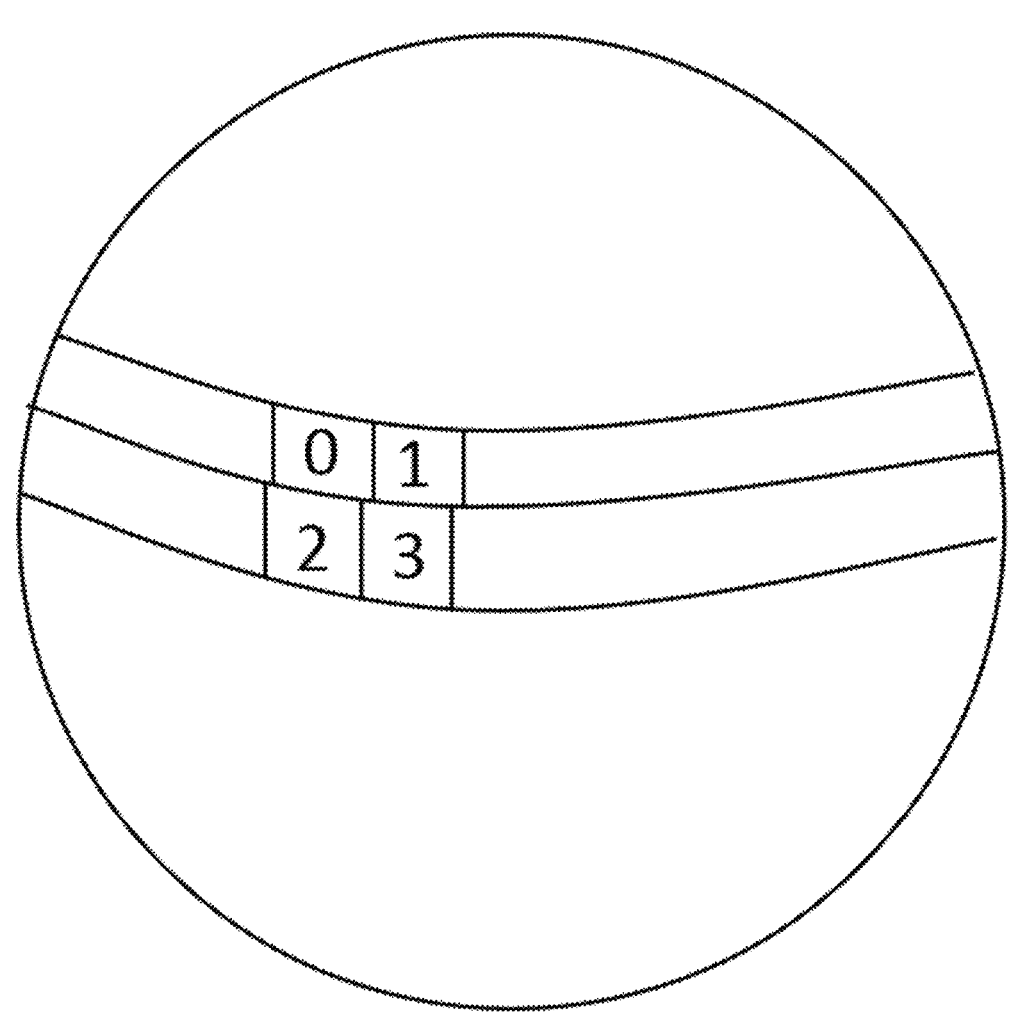
FIG. 3 shows a division of the total region into reference regions with associated indices according to an embodiment of the present disclosure.

If the total region/space of possible positions can be viewed as a plane, the reference region may be in the shape of hexagon as shown in FIG. 2. The reference region can also be in the shape of square, rectangle, diamond and so on. If the total region/space is a sphere such as the earth, the reference regions may be acquired by dividing the total region along the longitude and latitude. As shown in FIG. 3, the sphere is divided into several belts along the latitude. Each belt is divided into reference regions along the longitude. The edge length (e.g., degree of longitude/latitude) of the reference region is determined by the diameter of the visible region of the UE and/or network type of the BS.

When an aircraft is within a reference region, the BS needs to indicate the associated index of the reference region and the relative position of the aircraft in the reference region. A UE is able to derive the actual position of the aircraft by the following steps.

The UE determines the absolute position of the center of the reference region based on its own position and the received reference region index. This is because a UE, no matter where, cannot simultaneously receive signals from two different reference regions with the same index as shown in FIG. 2.

With the relative position and the absolute position of the reference region, the UE is able to derive the actual position of the aircraft.

In an embodiment, in the broadcast of ephemeris, the states of the indicated bits are mapped to the actual position and velocity.

The mapping can be independent and even within the possible ranges along the three axes, as shown in FIG. 1. For example, if N bits are used to represent the parameter X and the possible range of the parameter is $X \in (-P_{max}, P_{max})$, then the mapping is $$i \rightarrow \frac{2P_{max}}{2^N}(i + 0.5),$$

where $i \in \{-2^{N-1}, -2^{N-1}+1, \ldots, 2^{N-1}-1\}$ is one of the $2^N$ states of the N bits.

The mapping is similar for the velocity.

Figure 4:
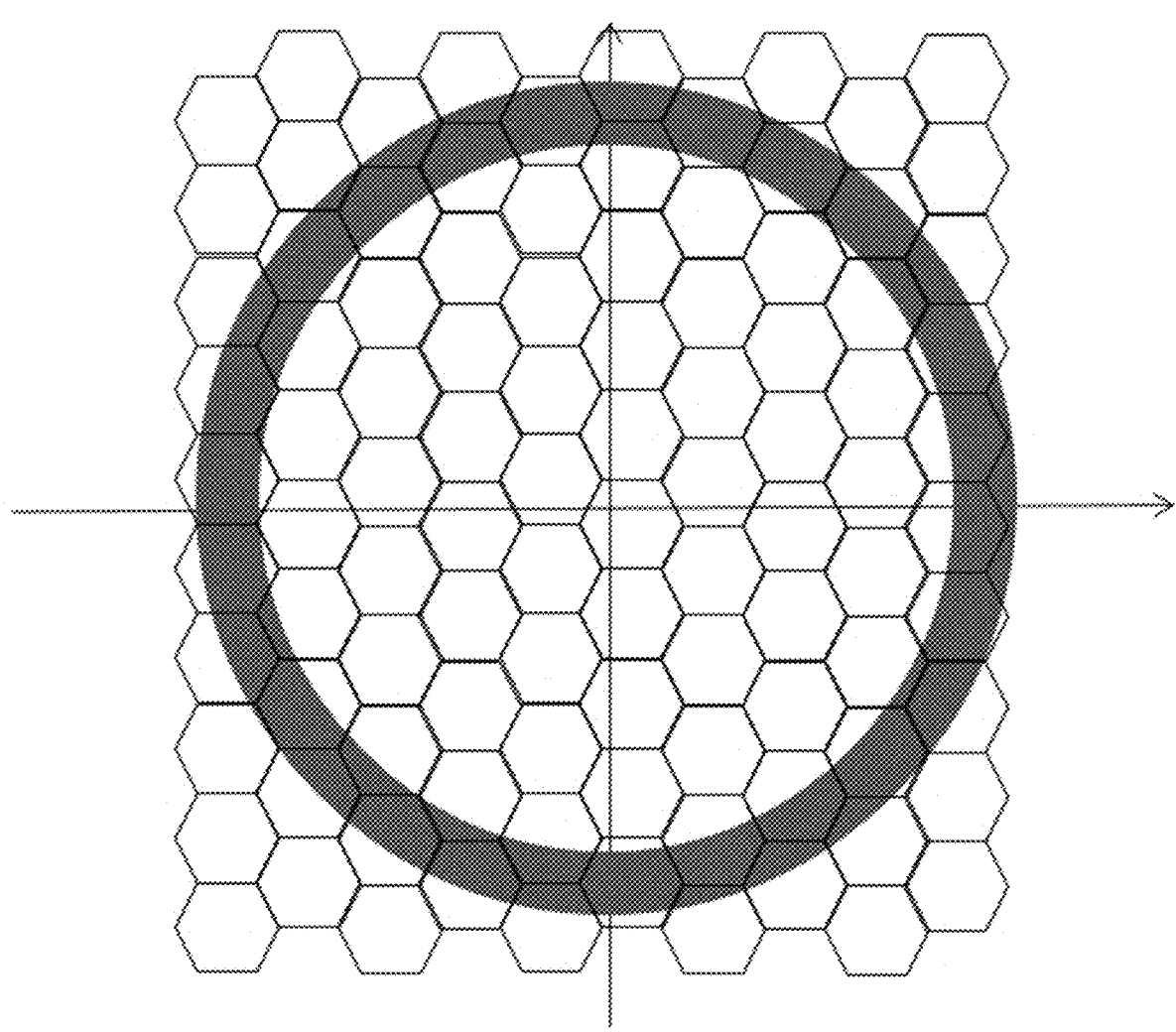
FIG. 4 shows a mapping of the bits to hexagon shapes according to an embodiment of the present disclosure.

FIG. 4 shows a mapping of the bits to hexagon shapes according to an embodiment of the present disclosure.

In the preceding embodiment, the total range is divided into small cubes in the mapping and the error in indication is limited by the edge length of the cubes. However, if the three parameters are not independently mapped, the total range may be divided into different shapes, which may be represented by fewer bits.

In an embodiment, if the parameters X, Y are both represented by N bits, they can be dependently mapped to divide the X-Y plane into hexagons, as shown in FIG. 4. X is mapped as described in the preceding embodiment, $Y \in (-P_{max}, P_{max})$ is mapped by $$j \rightarrow \begin{cases} \frac{2P_{max}}{2^N} j & i \text{ is even} \\ \frac{2P_{max}}{2^N}(j + 0.5) & i \text{ is odd} \end{cases},$$

where i, j is one of the $2^N$ states of the X, Y, respectively.

The mapping is similar for the velocity.

In an embodiment, similar to the foregoing, the three parameters of positions can be jointly mapped to divide the total range into truncated octahedron shapes to further reduce the bit number. For example, the mapping can be as follows:

$$(i,j,k) \rightarrow (x_0, y_0, z_0) + \sqrt{2}R(i+j-k, -i+j+k, i-j+k),$$

where (i, j, k) is the states of the three indicated parameters, which are mapped to an actual position in space.

The mapping is similar for the velocity.

In an embodiment, the three parameters in broadcast can also denote the position in the polar coordinate system, i.e., the polar angle, azimuth angle, and radical distance. This applies both for the three parameters of the position and the three parameters of the velocity.

In an embodiment, the mapping between the states of indicated bits to the actual position and velocity may not be even. For example, in LEO 600 network, more states of bits can be mapped to the positions when $\sqrt{X^2+Y^2+Z^2}$ is near 6371+600 km. In MEO 1200 network, more states of the bits can be mapped to the positions when $\sqrt{X^2+Y^2+Z^2}$ is near 6371+1200 km (e.g., in a range of 7571±20 km). In HAPS with nominal altitude 5 km, more states of the bits can be mapped to the positions when the altitude is near 5 km (e.g., in a range of (5±1) km).

In an embodiment, the state of a satellite can be determined by the six orbit parameters as described above in option 2. The parameters may be enhanced to save signaling.

In an embodiment, the semi-major axis $\alpha$ defines the length of the semi-major axis of the ellipse orbit. Actually, similar to the embodiment described above, $\alpha$ may generally only be in a limited range, such as 6971+(−10,10) km in LEO600 network and 6371+1200+(−20,20) km in MEO1200 network. The bits representing $\alpha$ can be mapped to a smaller range, which center is the theoretical average orbit altitude.

Figure 5:
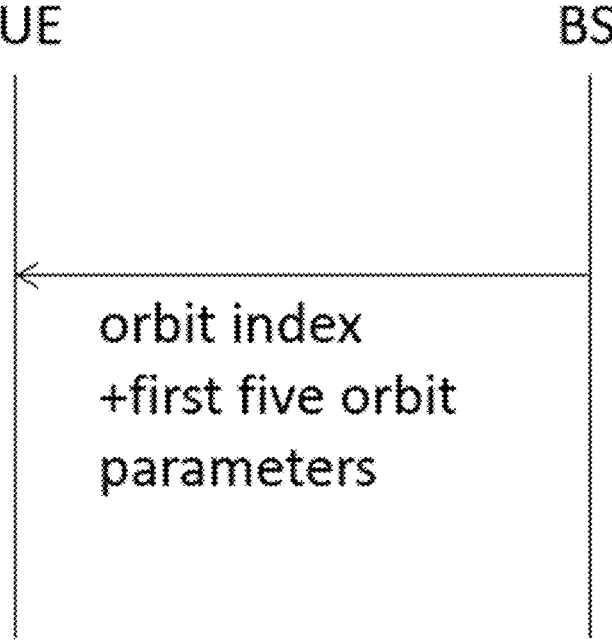
FIG. 5 shows an indication of an orbit with an associated index according to embodiments of the present disclosure.
Figure 6:
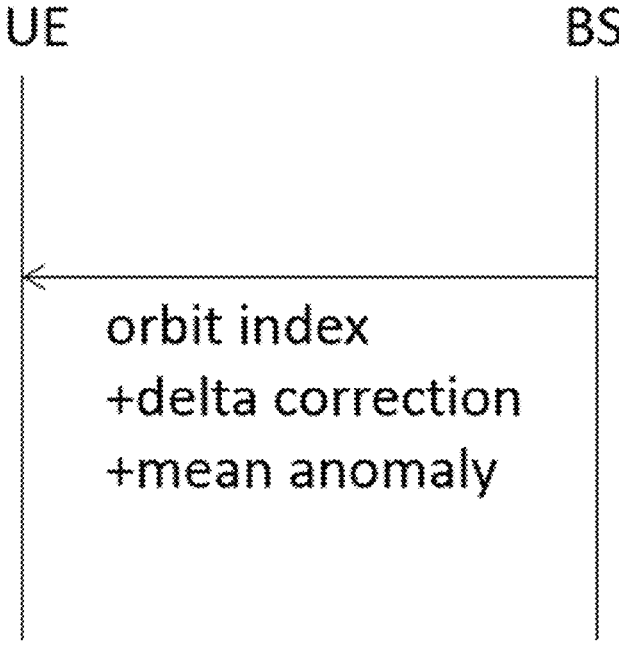
FIG. 6 shows an indication of the state of an aircraft such as a satellite according to an embodiment of the present disclosure.

FIG. 5 shows an indication of an orbit with an associated index and FIG. 6 shows an indication of the state of an aircraft such as a satellite according to embodiments of the present disclosure.

In an embodiment, to save the signaling, the first five orbit parameters can be stored or indicated to the UEs in advance, which defines possible ellipse orbits.

The satellite broadcasts its orbit index and the mean anomaly M to the UEs. The satellite also broadcast the delta correction for the orbit represented by the orbit index, which defines the difference of the actual satellite states with the pre-defined states.

The delta correction can be in the form of the first five orbit parameters, or in the form of position and velocity.

Figure 7:
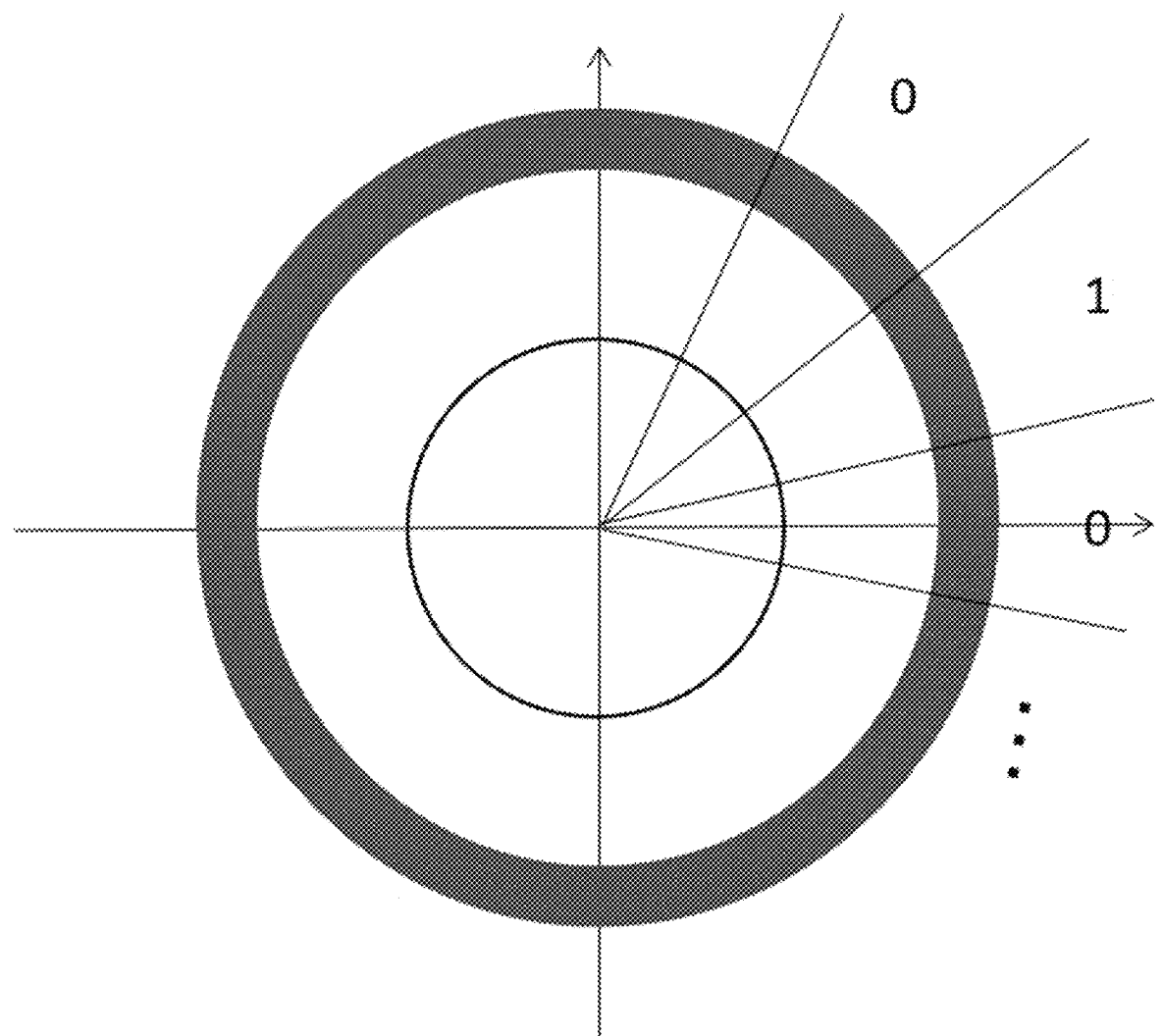
FIG. 7 shows a division of the total orbit and the associated index according to an embodiment of the present disclosure.

FIG. 7 shows a division of the total orbit and the associated index according to an embodiment of the present disclosure.

The mean anomaly defines the angle of a satellite in the given orbit. Similar to the embodiment described above, the mean anomaly of the satellite can be indicated in a relative method, so as to reduce bit number.

In an embodiment, as shown in FIG. 7, the orbit can be divided into reference regions, and each reference region is allocated with an index. When the satellite is within a reference region, the BS broadcasts the corresponding index, the relative position of the satellite in the reference regions, the orbit index and the delta correction.

A satellite is assumed to be visible or have relatively strong signal with respect to a UE when it is within the visible region of the UE. After receiving the broadcast information from the satellite, the UE can perform the following steps to derive the actual position of the satellite.

The UE determines the orbit of the satellite according to the orbit index and the delta correction.

When the visible region of the UE is smaller than one reference region, a UE is able to determine the position of the reference region based on its own position and the reference region index. As shown in FIG. 7, this is because a UE, no matter where, cannot simultaneously receive signals from two different reference regions with the same index.

With the relative position, the UE is able to derive the actual value of the mean anomaly.

Finally, the absolute position of the satellite is obtained with the delta correction.

Figure 8:
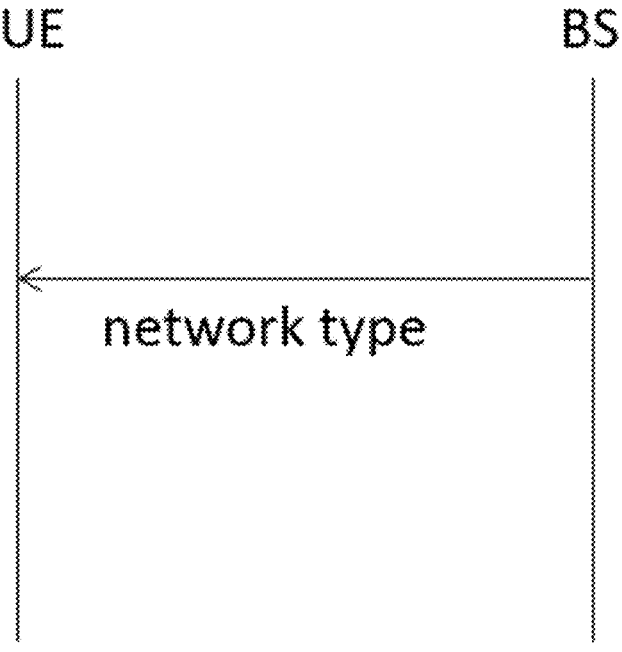
FIG. 8 shows an indication of the type of non-terrestrial network according to an embodiment of the present disclosure.

FIG. 8 shows an indication of the type of non-terrestrial network according to an embodiment of the present disclosure.

In an embodiment, the type of the non-terrestrial network can be indicated to the UEs, which indicates whether it is a network of GEO, LEO 600, LEO 500, MEO 1200, HAPS, and so on. The ephemeris format can be associated with the network type. For example, the LEO 600 network may use the orbit index, delta correction in forms of orbit parameters, and mean anomaly. The GEO network may use mean anomaly with a delta correction in forms of position and velocity. The HAPS network may use the small part index, relative position and the velocity. In this embodiment, the UE determines the ephemeris format, i.e., how to interpret the bits for ephemeris, based on the network type.

Figure 9:
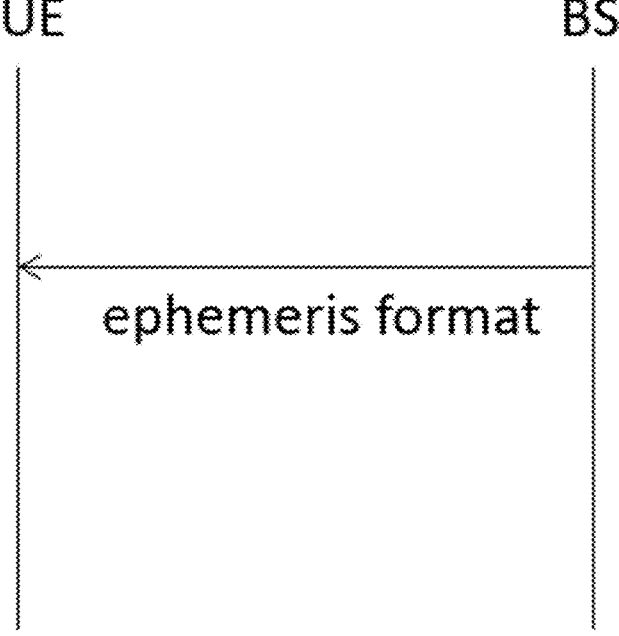
FIG. 9 shows an indication of applied ephemeris format according to an embodiment of the present disclosure.

FIG. 9 shows an indication of applied ephemeris format according to an embodiment of the present disclosure.

In an embodiment, the network may change the ephemeris format in broadcast, and may indicate the format to the UE. The UE receives the format and performs the mapping to the actual states according to the format.

In an embodiment, the network may indicate, by using RRC/MAC/SIB to the UEs, certain information associated with assisting the dividing of the total region and/or configuration of the reference region(s). The information may include at least one of an initial reference point, the edge width/length of the reference regions, the degree (of latitude and/or longitude) of one reference region (when the reference region is a fraction of an orbit), a valid time of the indicated information.

Figure 10:
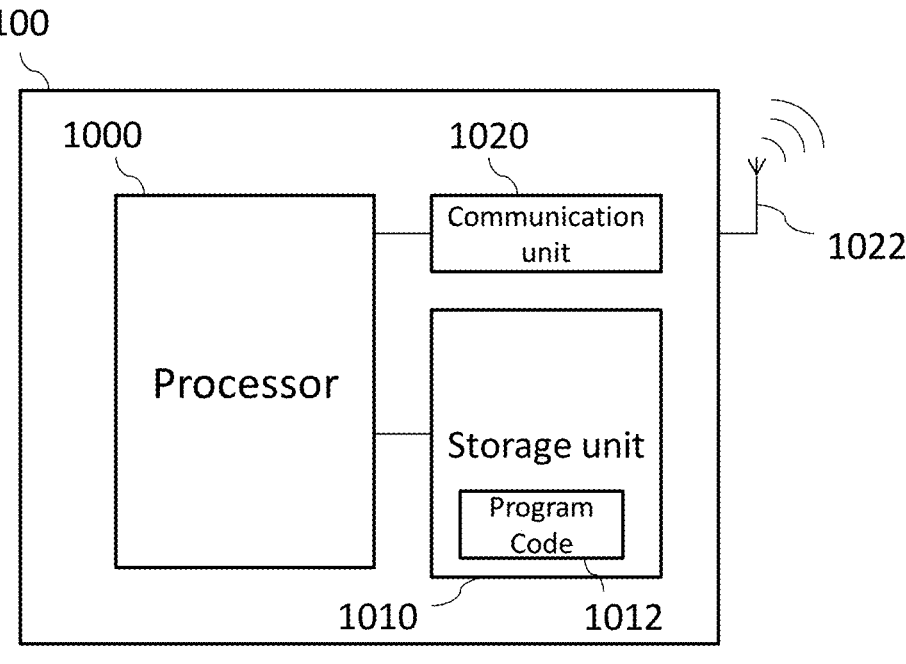
FIG. 10 shows an example of a schematic diagram of a wireless terminal according to an embodiment of the present disclosure.

FIG. 10 relates to a schematic diagram of a wireless terminal 100 according to an embodiment of the present disclosure. The wireless terminal 100 may be a user equipment (UE), a mobile phone, a laptop, a tablet computer, an electronic book or a portable computer system and is not limited herein. The wireless terminal 100 may include a processor 1000 such as a microprocessor or Application Specific Integrated Circuit (ASIC), a storage unit 1010 and a communication unit 1020. The storage unit 1010 may be any data storage device that stores a program code 1012, which is accessed and executed by the processor 1000. Embodiments of the storage unit 1012 include but are not limited to a subscriber identity module (SIM), read-only memory (ROM), flash memory, random-access memory (RAM), hard-disk, and optical data storage device. The communication unit 1020 may a transceiver and is used to transmit and receive signals (e.g., messages or packets) according to processing results of the processor 1000. In an embodiment, the communication unit 1020 transmits and receives the signals via at least one antenna 1022 shown in FIG. 10.

In an embodiment, the storage unit 1010 and the program code 1012 may be omitted and the processor 1000 may include a storage unit with stored program code.

The processor 1000 may implement any one of the steps in exemplified embodiments on the wireless terminal 100, e.g., by executing the program code 1012.

The communication unit 1020 may be a transceiver. The communication unit 1020 may as an alternative or in addition be combining a transmitting unit and a receiving unit configured to transmit and to receive, respectively, signals to and from a wireless network node (e.g., a base station).

Figure 11:
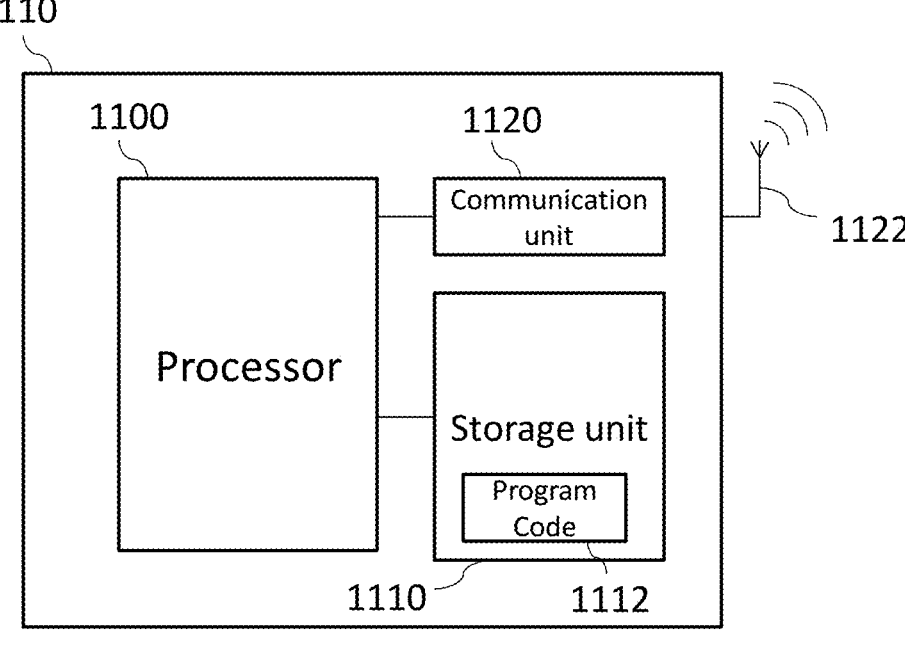
FIG. 11 shows an example of a schematic diagram of a wireless network node according to an embodiment of the present disclosure.

FIG. 11 relates to a schematic diagram of a wireless network node 110 according to an embodiment of the present disclosure. The wireless network node 110 may be a satellite, a HAPS, a UAV, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 110 may comprise (perform) at least one network function such as an access and mobility management function (AMF), a session management function (SMF), a user place function (UPF), a policy control function (PCF), an application function (AF), BSF, MB-SMF, NEF, etc. The wireless network node 110 may include a processor 1100 such as a microprocessor or ASIC, a storage unit 1110 and a communication unit 1120. The storage unit 1110 may be any data storage device that stores a program code 1112, which is accessed and executed by the processor 1100. Examples of the storage unit 1112 include but are not limited to a SIM, ROM, flash memory, RAM, hard-disk, and optical data storage device. The communication unit 1120 may be a transceiver and is used to transmit and receive signals (e.g., messages or packets) according to processing results of the processor 1100. In an example, the communication unit 1120 transmits and receives the signals via at least one antenna 1122 shown in FIG. 11.

In an embodiment, the storage unit 1110 and the program code 1112 may be omitted. The processor 1100 may include a storage unit with stored program code.

The processor 1100 may implement any steps described in exemplified embodiments on the wireless network node 110, e.g., via executing the program code 1112.

The communication unit 1120 may be a transceiver. The communication unit 1120 may as an alternative or in addition be combining a transmitting unit and a receiving unit configured to transmit and to receive, respectively, signals to and from a wireless terminal (e.g., a user equipment or another wireless network node).

FIG. 12 shows a flowchart of a method according to an embodiment of the present disclosure. The method may be used in a wireless terminal (e.g., UE) and comprises the following step:

Step 1201: Receive, from a wireless network node, ephemeris information of a wireless network node.

In FIG. 12, the wireless terminal receives ephemeris information of (ephemeris) of a wireless network node (e.g., BS or radio repeater in the NTN, satellite, HAPS, UAV) from the wireless network node.

In an embodiment, the ephemeris information comprises a node position and/or a velocity of the wireless network node.

In an embodiment, the ephemeris information comprises an association index and a relative position. The association index indicates one of a plurality of reference regions based on a wireless terminal position of the wireless terminal. The node position is determined based on the indicated reference region and the relative position. For instance, a difference between the node position and a reference point in the reference region associated with (e.g., indicated by) the associated index may be indicated.

In detail, the total region in which the wireless network node is possibly located may be divided into a plurality of reference regions and each reference region has an association index. In an embodiment, the total region may be viewed as a plane or a sphere and the reference region may be a plane or a spherical surface. Due to the limited visible regions of the wireless terminal, the wireless terminal cannot receive signals from the wireless terminals located in the reference regions which have the same association index.

Thus, based on the association index comprised in the ephemeris information and the wireless terminal location, the wireless terminal is able to determine the reference region in which the wireless network node is located. On the other hand, the relative position may indicate a difference between the node position and a reference point in the reference region. For instance, the reference point may be a center, a vertex, a starting point or an end point of the reference region. Based on the reference region and the relative position, the wireless terminal is able to acquire the node position of the wireless network node.

In an embodiment, at least one configuration parameter associated with (determining) the reference region comprises at least one of a reference point, an edge width, an edge length, a degree (range) of latitude, a degree (range) of longitude or a valid time of the at least one configuration parameter.

In an embodiment, at least one configuration parameter associated with the reference region is determined based on a network type of the wireless network node.

In an embodiment, the ephemeris information comprises a first parameter associated with a first value on a first axis, a second parameter associated with a second value on a second axis and a third parameter associated with a third value on a third axis. The first parameter, the second parameter and the third parameter are associated with the node position, the relative position or the velocity (e.g., X, Y, Z or $V_x$, $V_y$, $V_z$).

In an embodiment, a first range of the first value is determined based on the second value and the third value. For example, a square root of sum of squares of the first parameter, the second parameter and the third parameter may be limited in a confidence position range which is determined based on the network type of the wireless network node. In an embodiment of the network type being LEO600, the confidence position range of the node position may be 6971±10 kilometers, wherein 10 may be a variable changing with environmental parameters and/or system designs and/or network type. Thus, when the second value and the third value are set, the first range of the first parameter can be determined. Furthermore, a second range of the second value may be determined based on the third value.

Since the first range and/or the second range may be determined/limited/reduced, the number of bits used to indicate/represent the first parameter and/or the second parameter may be decreased. For example, the first parameter, the second parameter and the third parameter are associated with a plurality of bits (e.g. a resource element) and the number of bits associated with the first parameter within the plurality of bits is smaller than or equal to the number of bits associated with the second parameter within the plurality of bits and/or the number of bits associated with the third parameter within the plurality of bits. Moreover, the number of bits associated with the second parameter within the plurality of bits is smaller than or equal to the number of bits associated with the third parameter within the plurality of bits.

In an embodiment, the number of bits corresponding to the first parameter may be a variable determined based on the second value and the third value. Further, the number of bits corresponding to the second parameter may also be a variable determined based on the third value. Note that, the number of bits associated with the first parameter within the plurality of bits is smaller than or equal to the number of bits associated with the second parameter within the plurality of bits and/or the number of bits associated with the third parameter within the plurality of bits. The number of bits associated with the second parameter within the plurality of bits is smaller than or equal to the number of bits associated with the third parameter within the plurality of bits.

In an embodiment, two of the first parameter, the second parameter and the third parameter are mapped to a plurality of centers of a plurality of hexagons.

In an embodiment, the first parameter, the second parameter and the third parameter are mapped to a plurality of centers of a plurality of truncated octahedrons.

In an embodiment, the distribution of regions to which the first parameter, the second parameter and the third parameter are mapped (e.g., reference region) may not be even. For example, the first parameter, the second parameter and the third parameter may be mapped to a plurality of positions (e.g. a (center) point in each region to which the first parameter, the second parameter and the third parameter are mapped) and a density of the positions in a confidence position range is greater than that of the positions outside of the confidence position range. The confidence position range may be determined based on the network type of the wireless network node.

In an embodiment, the ephemeris information may comprise the semi-major axis, the eccentricity, the argument of periapsis, the longitude of ascending node, the inclination and the mean anomaly of the wireless network node. The first five parameters define an ellipse orbit of the wireless network node and the mean anomaly determines a position at the ellipse orbit as the node position.

In an embodiment, the ephemeris information comprises an association index and a relative mean anomaly. In this embodiment, the association index indicates one of a plurality of reference regions based on a wireless terminal position of the wireless terminal. In addition, the mean anomaly is determined based on the indicated reference region and the relative mean anomaly. For instance, the relative anomaly indicates a difference between the mean anomaly and a reference point in the reference region associated with (e.g., indicated by) the association index.

More specifically, the total range of the mean anomaly (e.g., 0 to $2\pi$, or 0 to 360°) may be divided into a plurality of reference regions and each reference region has an association index. That is, each reference region is a fraction of the (elliptical) orbit of the wireless network node. Because of the limited visible range of the wireless terminal, the wireless terminal cannot receive the signals from two reference regions having the same association index. Thus, based on the association index and the wireless terminal position, the wireless terminal is able to determine the reference region at which the mean anomaly of the wireless network node is located. Furthermore, the relative mean anomaly indicates a difference between a reference point (e.g., center, starting point or end point) in the reference region and the mean anomaly. Under such conditions, the wireless terminal can determine the mean anomaly comprised in the ephemeris information based on the association index and the relative mean anomaly.

In an embodiment, at least one configuration parameter associated with (determining) the reference region comprises at least one of a reference point, a degree (range) of one reference region or a valid time of the at least one configuration parameter.

In an embodiment, at least one configuration parameter associated with the reference region is determined based on a network type of the wireless network node.

In an embodiment, the semi-major axis is mapped to a confidence semi-major range smaller than a maximum range of the semi-major axis parameter. The confidence semi-major range may be determined based on the network type of the wireless network node. For example, the confidence semi-major range may be 6971±10 kilometers when the network type is LEO 600, 7571±20 kilometers when the network type is MEO 1200 or 5±1 kilometers when the network type is the UAV having the normal altitude of 5 kilometers.

In an embodiment, multiple sets of the semi-major axis, the eccentricity, the argument of periapsis, the longitude of ascending node and the inclination (i.e., multiple ellipse orbits) may be predefined and stored in the wireless terminal and/or the wireless network node. In this embodiment, the ephemeris information comprises an orbit index indicating one set of the semi-major axis, the eccentricity, the argument of periapsis, the longitude of ascending node and the inclination, so as to indicate the ellipse orbit.

In an embodiment, the ephemeris information further comprises correction information associated with at least one of the semi-major axis, the eccentricity, the argument of periapsis, the longitude of ascending node and the inclination. The correction information is used to correct/adjust the indicated set of the semi-major axis, the eccentricity, the argument of periapsis, the longitude of ascending node and the inclination, to acquire the accurate ellipse orbit. In this embodiment, the correction information is in a format comprising at least one parameter associated with at least one of the semi-major axis, the eccentricity, the argument of periapsis, the longitude of ascending node and the inclination. As an alternative, the correction information is represented by threes position values of three axes and/or three velocity values of three axes. That is, the correction information may be formulated based on any aforementioned embodiments related to option 1.

In an embodiment, the format of the ephemeris information (e.g., option 1 or 2) may be determined based on the network type of the wireless network node. The wireless terminal may receive the network type (e.g., parameter indicating the network type) in the ephemeris information or other signaling.

In an embodiment, the ephemeris information may comprise a format parameter indicating the format of the ephemeris information.

FIG. 13 shows a flowchart of a method according to an embodiment of the present disclosure. The method may be used in a wireless network node (e.g., BS or radio repeater in the NTN, satellite, HAPS, UAV) and comprises the following step:

Step 1301: Transmit, to a wireless terminal, ephemeris information of the wireless network node.

In FIG. 13, the wireless network node transmits its ephemeris information to a wireless terminal (e.g., UE).

In an embodiment, the ephemeris information comprises a node position and/or a velocity of the wireless network node.

In an embodiment, the ephemeris information comprises an association index and a relative position. For example, the association index indicates one of a plurality of reference regions based on a wireless terminal position of the wireless terminal. The node position is determined based on the indicated reference region and the relative position. For instance, a difference between the node position and a reference point in the reference region associated with (e.g., indicated by) the associated index may be indicated.

In detail, the region in which the wireless network node is possibly located may be divided into a plurality of reference regions and each reference region has an association index. In an embodiment, the total region may be viewed as a plane or a sphere and the reference region may be a plane or a spherical surface. Due to the limited visible region of the wireless terminal, the wireless terminal cannot receive signals from the wireless terminals located in the reference regions which have the same association index. Thus, based on the association index comprised in the ephemeris information and the wireless terminal location, the wireless terminal is able to determine the reference region in which the wireless network node is located. On the other hand, the relative position may indicate a difference between the node position and a reference point in the reference region. For instance, the reference point may be a center, a vertex, a starting point or an end point of the reference region. Based on the reference region and the relative position, the wireless terminal is able to acquire the node position of the wireless network node.

In an embodiment, at least one configuration parameter associated with (determining) the reference region comprises at least one of a reference point, an edge width, an edge length, a degree (range) of latitude, a degree (range) of longitude or a valid time of the at least one configuration parameter.

In an embodiment, at least one configuration parameter associated with the reference region is determined based on a network type of the wireless network node.

In an embodiment, the ephemeris information comprises a first parameter associated with a first value on a first axis, a second parameter associated with a second value on a second axis and a third parameter associated with a third value on a third axis. The first parameter, the second parameter and the third parameter are associated with the node position, the relative position or the velocity (e.g., X, Y, Z or $V_x$, $V_y$, $V_z$).

In an embodiment, a first range of the first value is determined based on the second value and the third value. For example, a square root of sum of squares of the first parameter, the second parameter and the third parameter may be limited in a confidence position range which is determined based on the network type of the wireless network node. In an embodiment of the network type being LEO600, the confidence position range of the node position may be 6971±10 kilometers, wherein 10 may be a variable changing with environmental parameters and/or system designs and/or network type. Thus, when the second value and the third value are set, the first range of the first parameter can be determined. Furthermore, a second range of the second value may be determined based on the third value.

Since the first range and/or the second range may be determined/limited/reduced, the number of bits used to indicate/represent the first parameter and/or the second parameter may be decreased. For example, the first parameter, the second parameter and the third parameter are associated with a plurality of bits (e.g. a resource element) and the number of bits associated with the first parameter within the plurality of bits is smaller than or equal to the number of bits associated with the second parameter within the plurality of bits and/or the number of bits associated with the third parameter within the plurality of bits. Moreover, the number of bits associated with the second parameter within the plurality of bits is smaller than or equal to the number of bits associated with the third parameter within the plurality of bits.

In an embodiment, the number of bits corresponding to the first parameter may be a variable determined based on the second value and the third value. Further, the number of bits corresponding to the second parameter may also be a variable determined based on the third value. Note that, the number of bits associated with the first parameter within the plurality of bits is smaller than or equal to the number of bits associated with the second parameter within the plurality of bits and/or the number of bits associated with the third parameter within the plurality of bits. The number of bits associated with the second parameter within the plurality of bits is smaller than or equal to the number of bits associated with the third parameter within the plurality of bits.

In an embodiment, two of the first parameter, the second parameter and the third parameter are mapped to a plurality of centers of a plurality of hexagons.

In an embodiment, the first parameter, the second parameter and the third parameter are mapped to a plurality of centers of a plurality of truncated octahedrons.

In an embodiment, the distribution of regions to which the first parameter, the second parameter and the third parameter are mapped (e.g., reference region) may not be even. For example, the first parameter, the second parameter and the third parameter may be mapped to a plurality of positions (e.g. a (center) point in each region to which the first parameter, the second parameter and the third parameter are mapped) and a density of the positions in a confidence position range is greater than that of the positions outside of the confidence position range. The confidence position range may be determined based on the network type of the wireless network node.

In an embodiment, the ephemeris information may comprise the semi-major axis, the eccentricity, the argument of periapsis, the longitude of ascending node, the inclination and the mean anomaly of the wireless network node. The first five parameters define an ellipse orbit of the wireless network node and the mean anomaly determines a position at the ellipse orbit as the node position.

In an embodiment, the ephemeris information comprises an association index and a relative mean anomaly. In this embodiment, the association index indicates one of a plurality of reference regions based on a wireless terminal position of the wireless terminal. In addition, the mean anomaly is determined based on the indicated reference region and the relative mean anomaly. For instance, the relative anomaly indicates a difference between the mean anomaly and a reference point in the reference region associated with (e.g., indicated by) the association index.

More specifically, the total range of the mean anomaly (e.g., 0 to $2\pi$, or 0 to 360°) may be divided into a plurality of reference regions and each reference region has an association index. That is, each reference region may refer to a fraction of the (elliptical) orbit of the wireless network node. Because of the limited visible range of the wireless terminal, the wireless terminal cannot receive the signals from two reference regions having the same association index. Thus, based on the association index and the wireless terminal position, the wireless terminal is able to determine the reference region at which the mean anomaly of the wireless network node is located. Furthermore, the relative mean anomaly indicates a difference between a reference point (e.g., center, starting point or end point) in the reference region and the mean anomaly. Under such conditions, the wireless terminal can determine the mean anomaly comprised in the ephemeris information based on the association index and the relative mean anomaly.

For example, the at least one configuration parameter associated with (determining) the reference region comprises at least one of a reference point, a degree (range) of one reference region or a valid time of the at least one configuration parameter.

In an embodiment, at least one configuration parameter associated with the reference region is determined based on a network type of the wireless network node.

In an embodiment, the semi-major axis is mapped to a confidence semi-major range smaller than a maximum range of the semi-major axis parameter. The confidence semi-major range may be determined based on the network type of the wireless network node. For example, the confidence semi-major range may be 6971±10 kilometers when the network type is LEO 600, 7571±20 kilometers when the network type is MEO 1200 or 5±1 kilometers when the network type is the UAV having the normal altitude of 5 kilometers.

In an embodiment, multiple sets of the semi-major axis, the eccentricity, the argument of periapsis, the longitude of ascending node and the inclination (i.e., multiple ellipse orbits) may be predefined and stored in the wireless terminal and/or the wireless network node. In this embodiment, the ephemeris information comprises an orbit index indicating one set of the semi-major axis, the eccentricity, the argument of periapsis, the longitude of ascending node and the inclination, so as to indicate the ellipse orbit.

In an embodiment, the ephemeris information further comprises correction information associated with at least one of the semi-major axis, the eccentricity, the argument of periapsis, the longitude of ascending node and the inclination. The correction information is used to correct/adjust the indicated set of the semi-major axis, the eccentricity, the argument of periapsis, the longitude of ascending node and the inclination, to acquire the accurate ellipse orbit. In this embodiment, the correction information is in a format comprising at least one parameter associated at least one of the semi-major axis, the eccentricity, the argument of periapsis, the longitude of ascending node and the inclination. As an alternative, the correction information is represented by threes position values of three axes and/or three velocity values of three axes. That is, the correction information may be formulated based on any of aforementioned embodiments related to option 1.

In an embodiment, the format of the ephemeris information (e.g., option 1 or 2) may be determined based on the network type of the wireless network node. The wireless network node may transmit the network type (e.g., parameter indicating the network type) in the ephemeris information or other signaling.

In an embodiment, the ephemeris information may comprise a format parameter indicating the format of the ephemeris information.

According to embodiments of the present disclosure, several ephemeris formats may be employed, e.g., to increase the accuracy of the ephemeris and/or to reduce signaling overhead. The characteristics of the formats include:

In an embodiment, with the prior information of the network, the possible value range of the position and velocity can be limited. The indicated bits are mapped only to the possible ranges of the position and velocity.

In an embodiment, the total space is divided into small cubes, hexagons, truncated octahedron, sectors, by using different mapping rules between the bits and the actual position/velocity. The mappings on different axis may be not independent. Besides, the density of the mapping may be different according to the possibility of the position.

In an embodiment, the possible range is divided into fixed small parts in advance, each part is associated with an index. The indicated ephemeris may only contain the relative position in the predefined small part and the index of the small part.

In an embodiment, the parameters of each orbit are indicated or stored at the UE side in advance. The indicated ephemeris contains an orbit index, delta corrections, and the angle of the satellite in the orbit. The delta correction can be in the form of orbit parameters, or simply position and velocity.

In an embodiment, the type of non-terrestrial network can be indicated to the UEs or be obtained by UEs in other methods. The applied ephemeris formats may be associated with the network types. The network is able to indicate the applied ephemeris format.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A wireless communication method for use in a wireless terminal, the wireless communication method comprising:

receiving, from a wireless network node, ephemeris information comprising a node position and a velocity of a wireless network node, wherein the ephemeris information comprises an association index and a relative position which are associated with the node position, wherein the relative position indicates a difference between the node position and a reference point in a reference region associated with the association index, and wherein the reference point is a center of the reference region.

2. The wireless communication method of claim 1, wherein the association index indicates one of a plurality of reference regions based on a wireless terminal position of the wireless terminal.

3. The wireless communication method of claim 2, wherein the association index is an index of the indicated reference region.

4. The wireless communication method of claim 2, wherein at least one configuration parameter associated with the reference region comprises at least one of a reference point, an edge width, an edge length, a degree range of latitude, a degree range of longitude or a valid time of the at least one configuration parameter.

5. The wireless communication method of claim 2, wherein at least one configuration parameter associated with the reference region is determined based on a network type of the wireless network node.

6. The wireless communication method of claim 1, wherein the ephemeris information comprises a first parameter associated with a first value on a first axis, a second parameter associated with a second value on a second axis and a third parameter associated with a third value on a third axis, and wherein the first parameter, the second parameter and the third parameter are associated with the relative position or the velocity.

7. The wireless communication method of claim 6, wherein a first range of the first value is determined based on the second value and the third value.

8. The wireless communication method of claim 6, wherein a second range of the second value is determined based on the third value.

9. The wireless communication method of claim 6, wherein the first parameter, the second parameter and the third parameter are associated with a plurality of bits, and wherein a number of bits associated with the first parameter within the plurality of bits is determined based on the second value and the third value.

10. The wireless communication method of claim 9, wherein a number of bits associated with the second parameter within the plurality of bits is determined based on the third value.

11. The wireless communication method of claim 9, wherein a number of bits associated with the first parameter within the plurality of bits is smaller than or equal to at least one of a number of bits associated with the second parameter within the plurality of bits or a number of bits associated with the third parameter within the plurality of bits.

12. The wireless communication method of claim 11, wherein the number of bits associated with the second parameter within the plurality of bits is smaller than or equal to the number of bits associated with the third parameter within the plurality of bits.

13. The wireless communication method of claim 6, wherein two of the first parameter, the second parameter and the third parameter are mapped to a plurality of centers of a plurality of hexagons.

14. The wireless communication method of claim 6, wherein the first parameter, the second parameter and the third parameter are mapped to a plurality of centers of a plurality of truncated octahedrons.

15. The wireless communication method of claim 6, wherein the first axis, the second axis and the third axis are axes of a polar coordinate system.

16. The wireless communication method of claim 6, wherein the first parameter, the second parameter and the third parameter are mapped to one of a plurality of positions, and wherein a density of the positions in a confidence position range is greater than a density of the positions outside of the confidence position range.

17. A wireless communication method for use in a wireless network node, the wireless communication method comprising:

transmitting, to a wireless terminal, ephemeris information comprising a node position and a velocity of the wireless network node, wherein the ephemeris information comprises an association index and a relative position which are associated with the node position, wherein the relative position indicates a difference between the node position and a reference point in a reference region associated with the association index, and wherein the reference point is a center of the reference region.

18. A wireless terminal, comprising:

a communication unit, configured to receive, from a wireless network node, ephemeris information comprising a node position and a velocity of a wireless network node, wherein the ephemeris information comprises an association index and a relative position which are associated with the node position, wherein the relative position indicates a difference between the node position and a reference point in a reference region associated with the association index, and wherein the reference point is a center of the reference region.

* * * * *